Figure 1B:
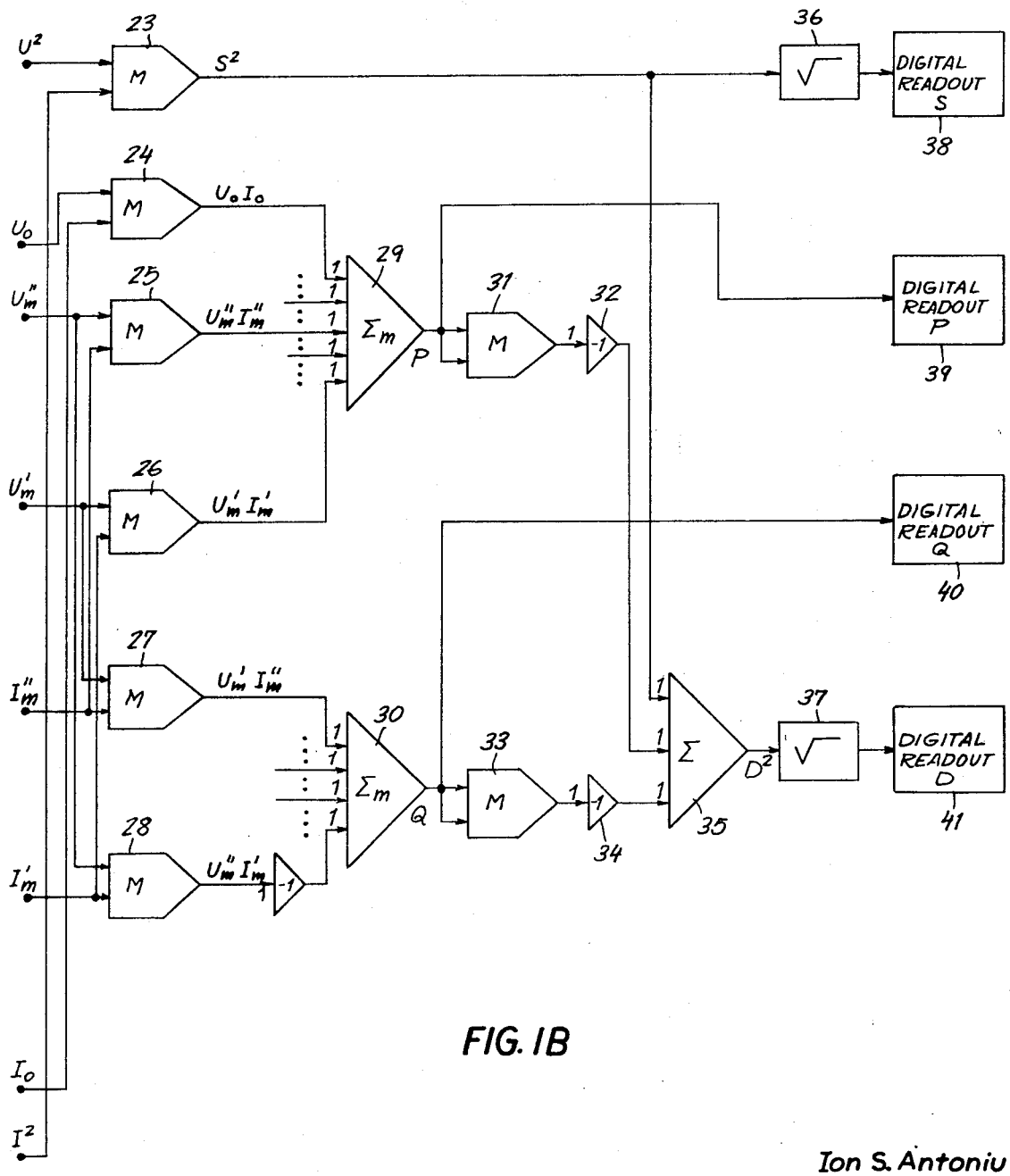

United States Patent [19]

Antoniu et al.

[11] 3,727,132

[45] Apr. 10, 1973

[54] METHOD OF AND SYSTEM FOR MEASURING ELECTRICAL POWERS IN AN ENERGETIC DEFORMANT STATE

[75] Inventors: Ion S. Antoniu; Mihai A. Leon, both of Bucharest, Romania

[73] Assignee: Ministerul Industriei Constructieilor De Masini, Bucharest, Romania

[22] Filed: Oct. 12, 1971

[21] Appl. No.: 188,466

[52] U.S. Cl. ................................................. 324/142
[51] Int. Cl. ............................................ G01r 21/00
[58] Field of Search .................... 324/77 E, 140, 141, 324/142; 235/151.3, 151.31

[56] References Cited

UNITED STATES PATENTS 3,466,431  9/1969  Fuchs et al. ........................... 324/77 E Primary Examiner—Alfred E. Smith
Attorney—Karl F. Ross

[57] ABSTRACT

A method of and system for ascertaining the magnitudes of active power, reactive power, apparent and deformant power with a electrical power line system operating in an energetic deformant state. The voltage and current waveforms, which are periodic but non-sinusoidal with respect to the time variation in the so-called "deformant state," are collected from the power line system and processed in suitable operational amplifiers, operating as integrators, in such a way as to yield the sine and cosine harmonics of those waveforms. These harmonics are further processed in summing amplifiers and multiplying devices to permit the active, reactive, apparent and deformant powers be obtained as output signals. The entire process is carried out automatically by analog circuitry which performs the mathematical operations as described.

10 Claims, 2 Drawing Figures

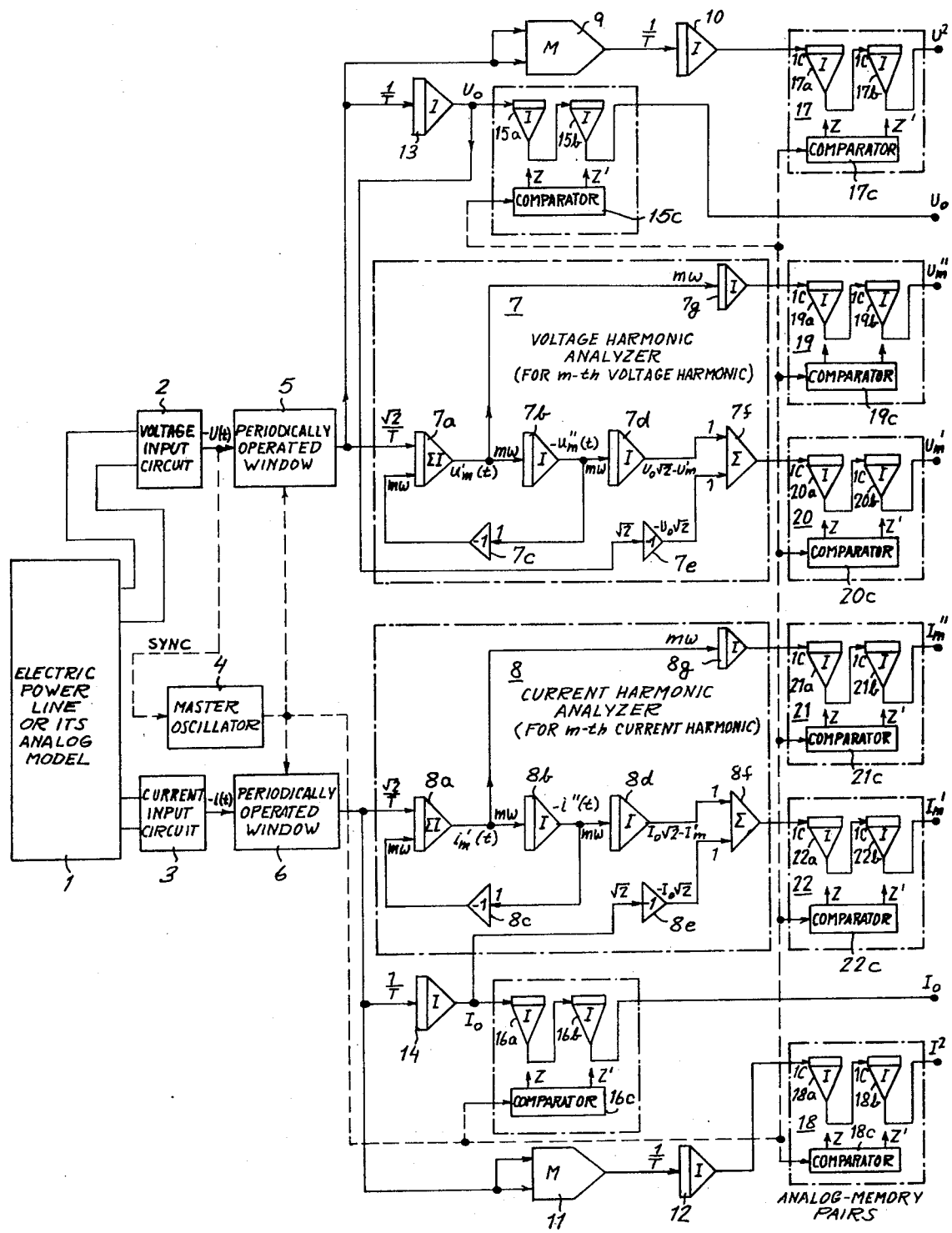
FIG. IA

Ion S. Antoniu
Mihai Leon
INVENTORS.

BY
Karl F. Ross
Attorney

METHOD OF AND SYSTEM FOR MEASURING ELECTRICAL POWERS IN AN ENERGETIC DEFORMANT STATE

FIELD OF THE INVENTION

This invention relates to a method for the determination of electrical power and to a system for carrying out this method.

BACKGROUND OF THE INVENTION

In the evaluation of electrical power systems, e.g. a three-phase electrical supply network and load, it is frequently desirable to ascertain the power consumed in that system. It is recognized that the energetic state of an electrical system may be considered in terms of the active (or real) power P, the reactive power Q and the apparent power S. When the electrical system is in a deformant state, that is the voltage and current waveforms are nonsinusoidal, it is also of the greatest interest to ascertain the correct magnitudes of the active power P, the reactive power Q, the apparent power S and the so-called "deformant power D", (or the "distortion power"), the latter occurring only in the deformant or nonsinusoidal state of the electrical system. (We define the deformant or nonsinusoidal state of an electrical system, as the steady-state when at least one or several periodic waveforms of the voltages or currents are nonsinusoidal).

These powers for electrical systems carrying non-sinusoidal currents and voltages may be calculated in terms of r.m.s. of the sine and cosine harmonics.

If $i(t)$ is the current through, and $u(t)$ is the voltage across, a electrical load with an deformant state, these periodic nonsinusoidal waveforms, satisfying the Dirichlet conditions, can be developed into a Fourier series, as follows:

$$u(t) = U_o + \sum_{k=1}^{\infty} U_k \sqrt{2} \sin(k\omega t + \alpha_k)$$
$$= U_o + \sum_{k=1}^{\infty} (U_k' \sqrt{2} \cos k\omega t + U_k'' \sqrt{2} \sin k\omega t) \quad (1)$$

$$i(t) = I_o + \sum_{k=1}^{\infty} I_k \sqrt{2} \sin(k\omega t + \beta_k)$$
$$= I_o + \sum_{k=1}^{\infty} (I_k' \sqrt{2} \cos k\omega t + I_k'' \sqrt{2} \sin k\omega t) \quad (2)$$

in which
- $\omega$ is the fundamental angular frequency;
- $\alpha_k$ is the initial phase angle for the $k$-th voltage harmonic;
- $\beta_k$ is the initial phase angle for the $k$-th current harmonic;
- $U_k' = U_k \sin \alpha_k$ is the r.m.s. for the cosine voltage harmonic of $k$-th order;
- $U_k'' = U_k \cos \alpha_k$ is the r.m.s. for the sine voltage harmonic of $k$-th order;
- $I_k' = I_k \sin \beta_k$ is the r.m.s. for the cosine current harmonic of $k$-th order;
- $I_k'' = I_k \cos \beta_k$ is the r.m.s. for the sine current harmonic of $k$-th order;
- $U_o$ is the d.c. component of the voltage (mean value over a period);
- $I_o$ is the d.c. component of the current (mean value over a period).

The electrical powers occuring with the deformant state of an electrical system may be expressed in terms of the r.m.s. of the cosine and sine harmonics of the voltage and current waveforms, as follows:

Active (Real) Power:

$$P = U_o I_o + \sum_{k=1}^{\infty} U_k I_k \cos(\alpha_k - \beta_k)$$
$$= U_o I_o + \sum_{k=1}^{\infty} (U_k' I_k' + U_k'' I_k'') \quad (3)$$

Reactive Power $$Q = \sum_{k=1}^{\infty} U_k I_k \sin(\alpha_k - \beta_k) = \sum_{k=1}^{\infty} (U_k' I_k'' - U_k'' I_k') \quad (4)$$

Apparent Power $$S = UI \quad (5)$$

Deformant (Distortion) Power $$D = \sqrt{S^2 - P^2 - Q^2} \quad (6)$$

in which $$U = \sqrt{\frac{1}{T} \int_0^T (u(t))^2 dt} = \sqrt{U_o^2 + \sum_{k=1}^{\infty} (U_k'^2 + U_k''^2)} \quad (7)$$

is the effective (r.m.s.) value of the voltage and $$I = \sqrt{\frac{1}{T} \int_0^T (i(t))^2 dt} = \sqrt{I_o^2 + \sum_{k=1}^{\infty} (I_k'^2 + I_k''^2)} \quad (8)$$

is the effective (r.m.s.) value of the current.

It has been possible to ascertain these magnitudes by manual calculation following the harmonic analysis of the voltage and current waveforms when simultaneous their oscillograms are available. This type of determination is extremely laborious, for even a single waveform.

It is possible to dispense with harmonic analysis and ascertain the power magnitudes using instruments presently available.

For example, the active power P can be measured with a conventional electrodynamic wattmeter, but systematic errors up to 20 percent are involved as a result of the nonsinusoidal voltage and current waveforms occurring with the deformant state.

The most important cause of these errors is the fact that the apparent impedance of the voltage coil of an electrodynamic wattmeter depends upon the frequency and, taking into account the active power in the deformant state is considered as the sum of the active powers caused by each group of the sine and cosine harmonics (see the forementioned equation (3)), the active power measured with the electrodynamic wattmeter will differ from its correct value. On the other hand, electrodynamic varmeters have also been produced to measure the reactive power for electrical systems, but here, too, due to similar considerations, considerable errors are involved when the measurement is taken in a deformant state. Errors $\epsilon_1$ and $\epsilon_2$ are present when the reactance is inductive and capacitive respectively, these errors being given as follows:

$$\epsilon_1 = 100 \frac{\sum_{k=1}^{n} \frac{k-1}{k} Q_k}{\sum_{k=1}^{n} Q_k} \quad (\%) \tag{9}$$

$$\epsilon_2 = 100 \frac{\sum_{k=1}^{n} (k-1) Q_k}{\sum_{k=1}^{n} Q_k} \quad (\%) \tag{10}$$

in which $$Q_k = U_k' I_k'' - U_k'' I_k' \tag{11}$$

$Q_k$ is the reactive power produced by the $k$-th sine and cosine voltage and current harmonics, considering the first n harmonics of nonsinusoidal voltage and current.

In addition, the varmeter (volt-amp-reactive) is often in error as a result of its operation conditions. It is well-known the method to measure the reactive power with a deformant state using an electrodynamic varmeter in the Lienard or Iliovici set-up.

When the varmeter is in the Lienard set-up, it indicates the following value for the reactive power $$Q_L = \sum_{k=1}^{\infty} \frac{1}{k} U_k I_k \sin(\alpha_k - \beta_k) = \sum_{k=1}^{\infty} \frac{1}{k} (U_k' I_k'' - U_k'' I_k') \tag{12}$$

while in the Iliovici set-up, for the same reactive power, it indicates the value $$Q_I = \sum_{k=1}^{\infty} K U_k I_k \sin(\alpha_k - \beta_k) = \sum_{k=1}^{\infty} K (U_k' I_k'' - U_k'' I_k') \tag{13}$$

Both values shown by equations (12) and (13) are different from the correct value of reactive power with a deformant state as determined by the I.E.C. (International Electrotechnical Commission), as described with reference to equation (4).

Consequently it is not possible to ascertain the correct value of the reactive power with a conventional varmeter operating in a deformant state. Moneover, as concerns the measurement of the apparent and deformant powers, so far no practical devices have been proposed.

OBJECT OF THE INVENTION

It is, therefore, the principal object of the present invention to provide an improved method of and system for ascertaining the magnitudes of active, reactive, apparent and deformant powers occuring in an electrical system operating with a deformant state.

SUMMARY OF THE INVENTION

The invention is based upon the principal that analog circuit elements consisting essentially of summing and integrating operational amplifiers, coefficient multiplying potentiometers, multiplying devices, squaring and root-squaring circuits may be used to carry out a substantially automatic harmonic analysis and ascertain the magnitudes of active, reactive, apparent and deformant powers and permit the direct read-out of these power values with periodic nonsinusoidals voltage and current waveforms derived from the electric power line or its analogue model simulated on an analogue computer.

The invention is based in part upon the recognition that the active power $P$ and the reactive power $Q$ of a system can be expressed by summations of the effective (r.m.s.) values of the sine and cosine harmonics of the voltage and current obtained from Fourier analysis as shown by the formulae (12) and (13), in which the summations are limited to a finite number $n$ of harmonics in accordance with the desired accuracy.

According to a feature of this invention, the harmonic analysis of a system is an energetic deformant state is automatically carried out with analog circuitry to yield a signal representing the active power magnitude P and a signal representing the reactive power $Q$; these signals are each squared to form the signals proportional to $P^2$ and $Q^2$ respectively. These signals being combined with an apparent power signal representing $S^2$ and derived by multiplication of the effective (r.m.s.) of the signal representing the powerline voltage and current to determine the deformant power magnitude D by a simple algebraic summation and root-squaring wherein $S^2$ and $P^2$, $Q^2$ have appropriate signs in accordance with the formula (6).

Another feature of this invention is that the signals, which in connection with the power-line voltage and current waveforms, represent the effective (r.m.s.) values $U$ and $I$, the mean values over a period (the d.c. values) $U_o$ and $I_o$ and, the effective (r.m.s.) values of voltage and current harmonics are automatically and simultaneously obtained as shown below by using a mathematical model simulated with analog circuitry and analog-memory pairs and after these output signals of analog-memory pairs are processed into the multipliers and summers as shown by the algorithm presented above to yield the signals representing the active, reactive, apparent and deformant powers.

Yet another feature of this invention permits each of the aforementioned powers to be represented upon a digital readout or individually as may be required. According to this invention, moreover, the active power $P$ and the reactive power $Q$, defined as noted earlier, are determined by breaking down the voltage and current waveforms into series of harmonic terms and are combined after integration by one or more summing operational amplifiers.

Throughout the following description, reference will be made to mathematical operations such as summation, multiplication, integration and sign inversion and it will be understood that each of these operations may be carried out with the aid of operational amplifiers in an analog computer circuit and that the invention includes not only the algorithm but the specific circuitry and computer diagram as well.

According to the present invention, in order to perform the harmonic analysis of a periodic time varying signal $x(t)$ we make use of the following mathematical model represented by the state matrix equations with zero initial conditions:

$$d/dt\,[x_m(t)] = [A_m][x_m(t)] + [B]x(t) \quad (14)$$

where $[x_m(t)]$ is the state vector with components $x_m'(t)$ and $x_m''(t)$, which are represented by the column matrix $$[x_m(t)] = \begin{bmatrix} x_m'(t) \\ x_m''(t) \end{bmatrix} \quad (15)$$

and $[A_m]$ is the square matrix $$[A_m] = \begin{bmatrix} 0 & -m\omega \\ m\omega & 0 \end{bmatrix} \quad (16)$$

and $[B]$ is the column matrix $$[B] = \begin{bmatrix} \frac{\sqrt{2}}{T} \\ 0 \end{bmatrix} \quad (17)$$

in which $T$ is the period of the periodic time varying signal $x(t)$ and $\alpha = 2\pi/T$ is its angular frequency.

In accordance to this invention, as we will show subsequently, the integrals of $x_m'(t)$ and $x_m''(t)$ with respect to time over a period $T$ will determine the effective (r.m.s.) values of the $m$-th sine and cosine harmonics. The impulse response $h_m(t)$ for zero initial conditions related to the mathematical model shown in equation (14) is determined by applying the Laplace transform to equation (14), when $x(t)$ equals the impulse function, as follows:

$$S[H_m(s)] = [A_m][H_m(s)] + [B] \quad (18)$$

in which $[H_m(s)]$ is the Laplace transform of $h_m(t)$ $$[H_m(s)] = L[h_m(t)] \quad (19)$$

Hence $$[H_m(s)] = (s[I] - [A_m])^{-1}[B] = \frac{\sqrt{2}}{T}\begin{bmatrix} \frac{s}{s^2 + m^2\omega^2} \\ \frac{m\omega}{s^2 + m^2\omega^2} \end{bmatrix} \quad (20)$$

and $$[h_m(t)] = \mathcal{L}^{-1}[H_m(s)] = \frac{\sqrt{2}}{T}\begin{bmatrix} \cos m\omega t \\ \sin m\omega t \end{bmatrix} \quad (21)$$

Therefore, the vector response $[x_m(t)]$ from the mathematical model (14), with periodic nonsinusoidal excitation $x(t)$, will be obtained by the convolution integral $$[x_m(t)] = \int_0^t [h_m(t-\tau)]x(\tau)d\tau \quad (22)$$

The Fourier series of the periodic nonsinusoidal excitation $x(t)$ is represented by $$x(t) = x_0 + \sum_{k=1}^{\infty}(X_k'\sqrt{2}\cos k\omega t + X_k''\sqrt{2}\sin k\omega t) \quad (23)$$

Henceforth the components $x_m'(t)$ and $x_m''(t)$ of the vector response $[x_m(t)]$ from equation (22) will be given by the following expressions:

$$x_m'(t) = \frac{\sqrt{2}}{T}\int_0^t x(\tau)\cos m\omega(t-\tau)d\tau$$

$$= \frac{t}{T}X_m'\cos m\omega t + X_m''\sin m\omega t)$$

$$+ \frac{X_0\sqrt{2} + X'}{m\omega T}\sin m\omega t$$

$$+ \sum_{\substack{k=1 \\ k\neq 1}}^{\infty}\frac{2X_k'}{(k^2-m^2)\omega T}(K\sin m\omega t - m\sin K\omega t)$$

$$+ \frac{2KX_k''}{(k^2-m^2)\omega T}(\cos m\omega t - \cos K\omega t) \quad (24)$$

$$x_m''(t) = \frac{\sqrt{2}}{T}\int_0^t x(\tau)\sin m\omega(t-\tau)d\tau$$

$$= \frac{t}{T}(X_m'\sin m\omega t - X_m''\cos m\omega t) + \frac{X_0\sqrt{2}}{m\omega T}$$

$$- \left(\frac{X_0\sqrt{2}}{m\omega T}\cos m\omega t - \frac{X_m''}{m\omega T}\sin m\omega t\right)$$

$$+ \sum_{\substack{k=1 \\ k\neq m}}^{\infty}\frac{2mX_k'}{(k^2-m^2)\omega T}(\cos m\omega t - \cos K\omega t)$$

$$+ \frac{2X_k''}{(k^2-m^2)T}(K\sin m\omega t - m\sin K\omega t) \quad (25)$$

Integrating these expressions over a period $T$ with respect to the time $t$, we obtain $$\int_0^T x'_m(t)dt = -\frac{1}{m\omega}X''_m \quad (26)$$

$$\int_0^T x''_m(t)dt = -\frac{1}{m\omega}X'_m + \frac{1}{m\omega}X_0\sqrt{2} \quad (27)$$

Hence, we obtain the values of the effective values of cosine and sine harmonics:

$$X'_m = -m\omega\int_0^T x''_m(t)dt + X_0\sqrt{2} \quad (28)$$

$$X''_m = -m\omega\int_0^T x'_m(t)dt \quad (29)$$

where $X_0$ is the mean value of the periodic non-sinusoidal excitation $x(t)$, which is given by $$X_0 = \frac{1}{T}\int_0^T x(t)dt \quad (30)$$

Applying this method, when in the mathematical model of equation (14) the periodic nonsinusoidal excitation $x(t)$ equals the signals representing either the voltage $u(t)$ or the current $i(t)$ of the electric power line, whose Fourier series are shown by equation (1) and (2) respectively, we obtain:

for the effective (r.m.s.) values of the cosine and sine voltage harmonics:

$$U'_m = -m\omega\int_0^T u''_m(t)dt + U_0\sqrt{2} \quad (31)$$

$$U''_m = -m\omega\int_0^T u'_m(t)dt \quad (32)$$

for the effective (r.m.s.) values of the cosine and sine current harmonics $$I_m' = -m\omega \int_0^T i_m''(t)\,dt + I_0\sqrt{2} \quad (33)$$

$$I_m'' = -m\omega \int_0^T i_m'(t)\,dt \quad (34)$$

The mathematical model of equation (14) is equivalent with the system of differential equations:
for the components $u_m'(t)$ and $u_m''(t)$ of voltage $u(t)$:

$$\frac{du_m'(t)}{dt} = -m\omega u_m''(t) + \frac{\sqrt{2}}{T} u(t) \quad (35)$$

$$\frac{du_m''(t)}{dt} = m\omega u_m'(t) \quad (36)$$

with zero initial conditions; and
for the components $i_m'(t)$ and $i_m''(t)$ of the current $i(t)$:

$$\frac{di_m'(t)}{dt} = -m\omega i_m''(t) + \frac{\sqrt{2}}{T} i(t) \quad (37)$$

$$\frac{di_m''(t)}{dt} = m\omega i_m'(t) \quad (38)$$

with zero initial conditions.

According to this invention, the differential equations (35), (36), (37), (38) are simulated with the aid of operational amplifiers operating as summers, integrators and sign invertors and the effective (r.m.s.) values shown at (31), (32), (33), (34) are selected with the aid of periodically operated windows (gates) and analog-memory pairs controlled by a master oscilator synchronized with the fundamental frequency of the electric power line.

The effective (r.m.s.) values of the voltage $U$ and the current $I$ are also determined by the formulas (7) and (8) respectively.

Finally, the effective (r.m.s.) values of voltage and current harmonics and also the mean values and effective (r.m.s) values of the voltage current waveforms once available, the active power $P$, reactive power $Q$, apparent power $S$ and deformant power $D$ will be determined by the formulas (3), (4), (5), (6), respectively, which are automatically determined with the aid the specific circuitry shown in the computer diagram of the present invention.

SPECIFIC DESCRIPTION

The invention will be described in greater detail hereinafter with reference to the accompanying drawings shown in FIGS. 1 A and 1 B, which describe the algorithm and illustrate the circuit diagram for ascertaining the magnitudes of active, reactive, apparent and deformant powers, respectively.

The various components of this circuit diagram are represented in conventional notation in terms of integrating amplifiers, summing amplifiers, sign invertors, etc. Referring now to FIG. 1 A, the circuit diagram for ascertaining the magnitudes of the forementioned powers is supplied by the periodic nonsinusoidal waveforms of the voltage and of the current of electric power line or of its analog model simulated on an analog computer.

The voltage and the current waveforms derived from the electric power line —its analog model 1 are applied to the voltage input circuit 2 and the current input circuit 3 respectively, which yield to their outputs the voltage equivalent signals $- u(t)$ and $= i(t)$ having the same waveform as the supplied voltage and current. These voltage signals $u(t)$ and $i(t)$ will be further processed in the circuit of this invention in order to ascertain the magnitudes of the aforesaid powers as output voltage signals.

The voltage signals $- u(t)$ and $- i(t)$ are respectively applied to the periodically operated windows 5 and 6, which are controlled by a master oscillator 4 synchronized in response to the voltage signal $u(t)$, so that the $- u(t)$ and 31 $i(t)$ signals are periodically propagated through windows 5 and 6, which are simultaneously open over a period $T$ and closed over the next period $T$ and so on.

The outputs of these windows 5 and 6 are simultaneously applied to voltage-harmonic analyzer 7 and current-harmonic analyzer 8 respectively, each of which comprises analog circuit elements consisting of integrating and summing operational amplifiers which are connected to simulate the mathematical models represented by the differential equation systems from (35), (36), (37) and (38).

In the drawing shown in FIG. 1A are represented the voltage and current analyzer only for the $m$-th harmonic and it will be understood that analogous analyzers connected in parallel are provided for all n harmonics which are to be considered.

Accordingly to the relationships (31) and (32), the voltage harmonic analyzer 7 for $m$-th voltage harmonic yields as output signals the effective (r.m.s.) values $U_m'$ and $U_m''$ representing the cosine and sine voltage harmonics respectively.

Also, taking into account the relationships (33) and (34), the current harmonic analyzer 8 for $m$-th current harmonic yields as output signals the effective (r.m.s.) values $I_m'$ and $I''_m$ representing the cosine and sine current harmonics respectively.

The outputs of windows 5 and 6 are also applied to multipliers 9 and 11 operating as squarers and the outputs of these multipliers are integrated over a period $T$ by the integrators 10 and 12 to yield $U^2$ and $I^2$ respectively, as shown by the relationships (7) and (8).

Similarly, the outputs of the same windows 5 and 6 are applied to integrators 13 and 14 which, carrying out the integrations over a period $T$ yield the mean (d.c.) values $U_o$ and $I_o$ of the voltage and current waweforms respectively. All the outputs of integrators $7g$, $8g$, 10, 12, 13, 14 and of the summers $7f$ and $8f$ are applied by the way of the analog-memory pairs 15–22 to the multiplier devices 23–28 which yield respectively to their outputs the signals $S^2$, $U_oI_o$, $U_m'' I_m''$, $U_m' I_m''$, $U_m'' I_m'$ as shown in the FIG. 1B.

As it is well-known in the art and are described (for exemple, in Huskey and Korn, Computer Handbook, McGraw-Hill, 1962, Chapter 6.3.12), the analog-memory pairs 15–22, shown in FIG. 1A, are controlled by the comparators 15c–22c actuated periodically by means of periodically applied voltages from the master oscilator 4. If we consider one of these analog-memory pairs, for exemple the analog-memory pair 19, when $z=1$ and $z'=0$, the integrator 19a is in RESET and tracks the input voltage applied to its initial-conditions (IC) terminal, while the integrator 19b is in HOLD and stores an output voltage obtained during the last cycle of operation. When $z=0$ and $z''=1$ the situation is reversed by electronic switching, so that integrator 19a now is in HOLD condition and stores the value obtained at the instant of switching, while the integrator 19b is now in RESET condition and reproduces at its output terminal during the next cycle of operation the voltage of integrator 19a during the last cycle of operation. The binary signals $z$ and $z'$ of the comparator control the HOLD and RESET conditions and are also periodically controlled by the master oscilator 4. The forementioned signals available at the outputs of multipliers 24–28 and also at the other similar multipliers which are understood for all the $n$ voltage and current harmonics considered, represent the inputs applied to the summing operational amplifiers 29 and 30 to yield at their outputs signals representing in accordance with the formulas (3) and (4), as shown in FIG. 1B, the active power $P$ and the reactive power $Q$ respectively. The outputs thereof serve as the inputs to multipliers 31 and 33 operating as squaring circuit from which the outputs signals $P^2$ and $Q^2$ are respectively obtained. After sign inversion in sign-inverting amplifiers 32 and 34, the signals $-P^2$ and $-Q^2$ are summed in the summing operational amplifier 35 with signal representing $S^2$, available at the output of the multiplier 23 in accordance with the relationship $$D^2 = S^2 - P^2 - Q^2 \qquad (39)$$

derived from (6) ; in this manner at the output of the summing amplifier 35, the signal representing the square of the deformant power $D^2$ is available.

The output signals of the summing amplifiers 29 and 30 representing the active power $P$ and the reactive powers $Q$ respectively, serve as the inputs for digital read-out devices 39 and 40.

The output signal of the multiplier 23 representing the square of the apparent power $S$ is applied to a digital readout device 38 calibrated in term of $S$, or the signal $S^2$ is applied to a digital read-out device 38 by the way of a square-root device 36.

Similarly, the output signal of the summing amplifier 25 representing the square of the deformant power $D$ is applied to a digital read-out device 41 calibrated in term of $D$ or the signal $D^2$ is also applied to a digital read-out device 41 by the way of a square-root device 37.

We note that the four powers $P, Q, S, D$ may be represented at choice simultaneously by four digital read-out devices 38–41, as shown in FIG.1B, or successively by a single digital read-out device.

What is claimed is:

1. A method of determining the active power, reactive power, apparent power and deformant power in an electric power line or its analog model, comprising the steps of:
   a. periodically subjecting the voltage and current waveforms of said line or its analog model to harmonic analysis based on the mathematical model represented by the state matrix equation $d[x_m(t)]/dt = [A_m][x_m(t)] + [B]x(t)$ with zero initial conditions where $x(t)$ is the periodic time-varying signal representing the analyzed wave form, $[x_m(t)]$ is the state vector of a harmonic $m$ with components $x_m'(t)$ and $x_m''(t)$ represented by the column matrix $$[x_m(t)] = \begin{vmatrix} x_m'(t) \\ x_m''(t) \end{vmatrix}$$

$[A_m]$ is the square matrix $$[A_m] = \begin{vmatrix} 0 & -m\omega \\ m\omega & 0 \end{vmatrix}$$

and $B$ is the column matrix $$[B] = \begin{vmatrix} \frac{\sqrt{2}}{T} \\ 0 \end{vmatrix}$$

$T$ being the period of the signal $x(t)$ and $\omega = 2\pi/T$ being its angular frequency, and thereafter integrating the signals representing the solutions of this equation with integrating operational amplifiers to produce signals proportional to the effective root-mean-square values of the voltage and current of each of a number of cosine and sine harmonics of the waveforms;

b. combining the effective values of the voltage and current signals of each of said harmonics to produce signals representing products of the form: $U_m' I_m'$, $U_m' I_m''$, $U_m' I_m''$, $U_m'' I_m'$. $U I$, $U_o I_o$, where $m$ represents the harmonic order, $U_m'$ and $I_m'$ represent the effective root-mean-square values of the cosine harmonics of the voltage and current waveforms respectively, $U_m''$ and $I_m''$ represent the effective root-mean-square values of the sine harmonics of the voltage and current waveforms respectively, $U$ and $I$ represent the effective values of the voltage and current waveforms respectively, $U_o$ and $I_o$ represent the mean values of a period of the voltage and current waveforms respectively; and c. summing said product signals in summing operational amplifiers to produce signals representing the aforementioned power magnitude.

2. The method defined in claim 1 wherein steps (a), (b) and (c) are to produce output signals representing the active power $P$ and the reactive power $Q$ of the electric power line of its analog model, said method further comprising the steps of:
   d. deriving a further electrical signal from said electric power line and representing the apparent power $S$; and
   e. electronically combining the output signals representing $P, Q$ and $S$ to form a further output signal representing the deformant power D in accordance with the relationship:

$$S = \sqrt{P^2 + Q^2 + D^2}.$$

3. The method defined in claim 2 wherein the output signals representing $P, Q$ and $S$ are squared in a multipling device and are thereafter algebraically combined in a summing operational amplifier to produce an output signal representing the power magnitude $D^2$.

4. The method defined in claim 3, further comprising the step of providing a digital readout of at least some of said output signals.

5. The method defined in claim 1 wherein the signals summed in the operational amplifiers of step (c) include a plurality of groups of signals of the type
$U_m' I_m'$, $U_m'' I_m''$, $U_m' I_m''$, $U_m'' I_m'$, $U I$, $U_o I_o$.

6. A system for analyzing the power relationships of a power line or its analog model connected to a said power line or its analog model comprising:
periodically operated windows controlled with the aid of a master oscillator synchronized with the frequency power line, comprising:
analog harmonic analyzer means including integrating operational amplifiers for producing signals proportional to the effective root-mean-square values of the voltage and currents of each of a number of cosine and sine harmonics of the power line or its analog model;
multiplier devices connected to said integrating operational amplifiers, by the way of analog-memory pairs, for producing signals representing products of the form $U_m' I_m'$, $U_m'' I_m'$, $U_m' I_m''$, $U_m'' T_m''$, $U I$, $U_o T_o$
wherein $U_m'$ and $I_m'$ represent the effective root-mean-square values of the cosine harmonics of the voltage and current waveforms respectively, $U_m''$ and $I_m''$ represent the effective root-mean-square values of the sine harmonics of the voltage and current waveforms respectively, $U$ and $I$ represent the effective root-mean-square values of the voltage and current waveforms respectively, $U_o$ and $I_o$ represent the mean values over a period of the voltage and current waveforms respectively; and means summing the signals representing said products to produce output signals representing the said power magnitudes.

7. The system defined in claim 6, further comprising digital readout means connected with aid summing amplifiers for providing digital indications of said power magnitudes.

8. The system defined in claim 7, further comprising multipliers operating as squaring circuits and integrators connected to the outputs of the windows, for producing an output signal representing the apparent power $S$; and summing amplifier means for combining said output signals to produce signal representing the deformant power $D$ of the said electric power line or its analog model, with the relationship $$D = \sqrt{S^2 - P^2 - Q^2}.$$

9. The system defined in claim 8 further comprising analog squaring circuits energized by each of said output signals for producing further signals representing the square of the respective power magnitudes, the latter signals being fed to the last-mentioned summing amplifier, thereby forming a signal representing the magnitude $D^2$.

10. The system defined in claim 9, further comprising a digital readout device connected to the last-mentioned amplifier for providing a visual indication of the magnitude $D$.

* * * * *